United States Patent [19]

Walker

[11] Patent Number: 4,498,997

[45] Date of Patent: Feb. 12, 1985

[54] METHOD AND COMPOSITION FOR ACIDIZING SUBTERRANEAN FORMATIONS

[75] Inventor: Michael L. Walker, Duncan, Okla.

[73] Assignee: Halliburton Company, Duncan, Okla.

[21] Appl. No.: 507,388

[22] Filed: Jun. 24, 1983

[51] Int. Cl.$^3$ ............................................. E21B 43/27
[52] U.S. Cl. ................... 252/8.55 C; 422/12; 252/389 R
[58] Field of Search ............. 252/8.55 C, 389.54, 252/143, 147; 422/12

[56] References Cited

U.S. PATENT DOCUMENTS

| | | |
|---|---|---|
| 1,915,148 | 6/1933 | Berliner et al. . |
| 1,956,266 | 4/1934 | Berliner . |
| 2,078,256 | 4/1937 | Lieber et al. . |
| 2,152,659 | 4/1939 | Nitti . |
| 2,177,561 | 10/1939 | Cook . |
| 2,257,750 | 10/1941 | Lincoln et al. . |
| 2,282,707 | 5/1942 | Cook . |
| 2,431,715 | 12/1947 | Wachter . |
| 2,657,145 | 10/1953 | Arendt . |
| 2,701,206 | 2/1955 | Fales . |
| 2,795,551 | 6/1957 | Harle et al. . |
| 2,814,593 | 12/1957 | Beiswanger et al. ............... 252/8.55 |
| 2,861,924 | 11/1958 | Raifsnider . |
| 2,869,978 | 1/1959 | Fischer . |
| 3,249,547 | 5/1966 | Fisher . |
| 3,338,829 | 8/1967 | Langguth et al. . |
| 3,492,229 | 1/1970 | Weiss . |
| 3,506,581 | 4/1970 | Kucera ........................... 252/8.55 X |
| 3,686,129 | 8/1972 | Loucks . |
| 3,773,465 | 11/1973 | Keeney et al. . |
| 3,779,935 | 12/1973 | McDougall et al. . |
| 3,808,140 | 4/1974 | Mago et al. . |
| 3,816,322 | 6/1974 | Griffin et al. .................. 252/8.55 X |
| 3,896,044 | 7/1975 | Mago et al. . |
| 3,951,844 | 4/1976 | Mago . |
| 3,959,170 | 5/1976 | Mago et al. . |
| 4,324,669 | 4/1982 | Norman et al. . |
| 4,371,443 | 2/1983 | Keeney . |

*Primary Examiner*—Herbert B. Guynn
*Attorney, Agent, or Firm*—Robert A. Kent; Thomas R. Weaver

[57] ABSTRACT

The present invention relates to a method of acidizing a subterranean formation or well bore employing an acidic solution containing a corrosion inhibitor composition comprising an inhibiting effective amount of an acetylenic alcohol, a quaternary ammonium compound, an aromatic hydrocarbon and an antimony compound.

15 Claims, No Drawings

METHOD AND COMPOSITION FOR ACIDIZING SUBTERRANEAN FORMATIONS

BACKGROUND OF THE INVENTION

1. Field of the Invention

The present invention relates to a method of acidizing a subterranean formation or wellbore employing an acidic solution containing a corrosion inhibitor which substantially reduces the corrosive effects of the acidic solution on ferrous metals in contact with the acidic solution.

2. Prior Art

Acidizing and fracturing treatments using aqueous acidic solutions commonly are carried out in hydrocarbon-containing subterranean formations penetrated by a well bore to accomplish a number of purposes, one of which is to increase the permeability of the formation. The increase in formation permeability normally results in an increase in the recovery of hydrocarbon from the formation.

In acidizing treatments, aqueous acidic solutions are introduced into the subterranean formation under pressure so that the acidic solution flows into the pore spaces of the formation. The acidic solution reacts with acid-soluble materials contained in the formation which results in an increase in the size of the pore spaces and an increase in the permeability of the formation.

In fracture acidizing treatments, one or more fractures are produced in the formation and the acidic solution is introduced into the fracture to etch flow channels in the fracture face. The acid also enlarges the pore spaces in the fracture face and in the formation.

The rate at which acidizing fluids react with reactive materials in the subterranean formation is a function of various factors including acid concentration, temperature, fluid velocity, the type of reactive material encountered and the like. Whatever the rate of reaction of the acidic solution, the solution can be introduced into the formation only a certain distance before it becomes spent. It is desirable to maintain the acidic solution in a reactive condition for as long a period of time as possible to maximize the permeability enhancement produced by the acidic solution.

A problem associated with acidizing subterranean formations is the corrosion by the acidic solution of the tubular goods in the well bore and the other equipment used to carry out the treatment. The expense of repairing or replacing corrosion damaged equipment is extremely high. The corrosion problem is exacerbated by the elevated temperatures encountered in deeper formations. The increased corrosion rate of the ferrous metals comprising the tubular goods and other equipment results in quantities of the acidic solution being neutralized before it ever enters the subterranean formation. The partial neutralization of the acid results in the production of quantities of metal ions which are highly undesirable in the subterranean formation.

Various methods have been proposed to decrease the corrosion problem related to acidizing treatments, however, the corrosion inhibitors employed generally are effective only at temperature levels below about 250° F. It would be desirable to provide a composition and method for acid treating a subterranean formation which overcomes at least some of the corrosion problem resulting from contact of the aqueous acidic treating solutions with ferrous metals.

SUMMARY OF THE INVENTION

The present invention relates to a method of acidizing a subterranean formation employing an acidic solution containing a corrosion inhibitor which substantially reduces the corrosive effect of the acid on ferrous metals without reducing the effectiveness of the acidic solution in treating the subterranean formation. The acidizing solution is introduced into a subterranean formation through a well bore at a flow rate and pressure sufficient to permit the acid to dissolve formation materials or foreign material in the vicinity of the well bore. The acidic solution can comprise, for example, a solution of hydrochloric acid, or mixtures of hydrochloric acid with hydrofluoric acid, acetic acid, formic acid or hydrofluoric acid, sulfuric acid, formic acid, acetic acid, mixtures thereof and the like. The inhibitor comprises a composition comprising corrosion-reducing effective amounts of one or more acetylenic alcohols, a quaternary ammonium compound, an aromatic hydrocarbon having high oil-wetting characteristics and an antimony compound. The antimony compound can comprise any antimony compound which is capable of activation by the other constituents of the inhibitor. The corrosion inhibitor is particularly effective in reducing the corrosive effects of acidic solutions in contact with ferrous metals where the temperature at which the metal and acid are in contact is between about 150° F. and 500° F.

DESCRIPTION OF THE PREFERRED EMBODIMENT

In accordance with the present invention, there is provided an aqueous acidic solution comprising an aqueous fluid, an acid and a corrosion inhibitor containing an activated antimony compound.

The acids employed in the practice of the present invention can comprise hydrochloric acid or mixtures of hydrochloric acid with hydrofluoric and acetic acid, formic acid or mixtures of these acids and the like.

The corrosion inhibitor comprises a composition comprising effective amounts of one or more acetylenic alcohols, a quaternary ammonium compound, an aromatic hydrocarbon having high oil-wetting characteristics and an antimony compound which is capable of activation by the other constituents of the corrosion inhibitor.

The acetylenic alcohols employed in the present invention may suitably include substantially any of the acetylenic compounds having the general formula:

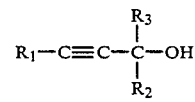

wherein $R_1$, $R_2$ and $R_3$ are hydrogen, alkyl, phenyl, substituted phenyl or hydroxy-alkyl radicals. Preferably, $R_1$ comprises hydrogen. Preferably, $R_2$ comprises hydrogen, methyl, ethyl or propyl radicals. Preferably, $R_3$ comprises an alkyl radical having the general formula $C_nH_{2n}$ where n is an integer from 1 to 10.

Some examples of acetylenic alcohols which can be employed in accordance with the present invention are, for example, methyl butynol, methyl pentynol, hexynol, ethyl octynol, propargyl alcohol, benzylbutynol, ethynylcyclohexanol and the like. Preferred alcohols are hexynol, propargyl alcohol, methyl butynol and ethyl octynol.

The quaternary ammonium compounds employed in the present invention comprise aromatic nitrogen compounds which may be illustrated by alkyl pyridine-N-methyl chloride quaternary, alkyl pyridine-N-benzyl chloride quaternary, quinoline-N-methyl chloride quaternary, quinoline-N-benzyl chloride quaternary, isoquinoline quaternaries, benzoquinoline quaternaries, chloromethyl naphthalene quaternaries of the above, admixtures of the compounds and the like.

The hydrocarbon compound can comprise substantially any aromatic compound which exhibits high oil-wetting characteristics. The aromatic hydrocarbon compound can comprise, for example, xylenes, saturated biphenyl-xylenes admixtures, heavy aromatic naphtha, heavy aromatic solvent, tetralene, tetrahydroquinoline, tetrahydronaphthalene and the like.

The antimony compound which is employed in the present invention can comprise any antimony compound which is activated by the other constituents of the corrosion inhibitor to cause the corrosion inhibitor to substantially reduce the corrosive effect of the acid in the aqueous acidic solution on ferrous metals in contact with the acidic solution. The antimony compound can comprise, for example, antimony trioxide, antimony pentoxide, antimony trichloride, antimony sulfide, antimony pentachloride, potassium antimony tartrate and other alkali metal salts thereof, antimony tartrate, antimony trifluoride, potassium pyroantimonate and other alkali metal salts thereof, antimony adducts of ethylene glycol, solutions containing ethylene glycol, water and the oxidized product of hydrogen peroxide and antimony trioxide or any other trivalent antimony compound and the like.

The acetylenic alcohol, aromatic hydrocarbon and quaternary amine are present in the corrosion inhibitor in an amount sufficient to effect an activation of the antimony compound whereby the composition can significantly reduce the corrosive effect of an acid on a ferrous metal in comparison to the reduction in corrosive effect resulting from the use of the individual components or admixtures of less than all the components. Preferably, the acetylenic alcohol is present in the corrosion inhibitor in an amount sufficient to comprise at least five percent by volume of the inhibitor composition. Most preferably, the acetylenic alcohol comprises from about 5 to about 35 percent of the composition. Preferably, the ratio of the volume of acetylenic alcohol to the volume of aromatic hydrocarbons is at least about 0.05:1.0. Most preferably, the ratio of acetylenic alcohol to aromatic hydrocarbon is in the range of from about 0.08:1.0 to about 1.66:1.0. Preferably, a sufficient quantity of the antimony compound is added to obtain a solution having a concentration of from about 0.0007 to about 0.04 molar. The antimony compound may be admixed with the other constituents of the corrosion inhibitor composition to form a premixed inhibitor or it may be formulated in situ in an acidic solution by the addition of a sufficient quantity of the antimony compound and a quantity of the other constituents which may be premixed. The quaternary amine and any additional additives constitute the remainder of the corrosion inhibitor.

Additional additives which can be present in the corrosion inhibitor can comprise, for example, a solvent such as an alkanol to assist in maintaining the constituents of the corrosion inhibitor as a homogeneous admixture.

Alkanols which can be employed in the present invention are, for example, methyl, ethyl, propyl, isopropyl, butyl, pentyl, hexyl, heptyl, octyl and the higher liquid members of these aliphatic alcohols. Preferably, the quantity of alkanol employed is that which merely is sufficient to maintain the constituents in homogeneous admixture as excess quantities have no demonstrable effect on the effectiveness of the corrosion inhibitor. Preferably, the alkanol comprises less than about fifteen percent by volume of the corrosion inhibitor composition to avoid unnecessary dilution of the inhibitor composition.

The corrosion inhibitor also can include a nonionic surfactant which facilitates dispersion of the corrosion inhibitor in the aqueous acidic solution.

The non-ionic surfactant can comprise an ethoxylated oleate, tall oils or ethoxylated fatty acids. The 8 to 20 moles of ethylene oxide adducts of octyl phenol, nonyl phenol, tridecyl phenol and the like are preferred. Sufficient non-ionic surfactant is admixed with the other constituents of the corrosion inhibitor to facilitate dispersion of the corrosion inhibitor in the aqueous acidic solution. Preferably, the surfactant comprises less than about 20 percent by volume of the corrosion inhibitor composition to avoid unnecessary dilution of the inhibitor composition.

The method of the present invention is carried out by first admixing the aqueous fluid with the acid to provide an acidic solution of a desired concentration. The corrosion inhibitor then is admixed with the solution in an amount sufficient to substantially reduce the corrosion rate of the acid on ferrous metals in contact with the acid. When the corrosion inhibitor is generated in situ in the acidic solution, preferably the acetylenic alcohol, aromatic hydrocarbon quaternary ammonium compound and other additives are admixed prior to addition of the antimony compound. The amount of corrosion inhibitor utilized in the practice of the invention can vary over a substantial range. Preferably, the inhibitor is present in an amount of from about 10 to about 30 gallons per 1,000 gallons of acidic solution. The quantity of corrosion inhibitor will depend upon the concentration of the acid employed and the temperature at which the acidic solution will contact ferrous metal surfaces.

The aqueous acidic solution of the present invention can be prepared in any suitable tank equipped with suitable mixing means well known to individuals skilled in the art. The solution may be transferred either at a controlled rate directly into the well bore or into a convenient storage tank for injection down the well bore.

The aqueous acidic solution is introduced into the subterranean formation whereby either foreign material in the well bore or in the formation or formation materials are dissolved to thereby increase the permeability of the formation. The increased permeability permits better flow of hydrocarbon fluids through the formation and into its well bore. The pumping rate and pressure utilized will depend upon the characteristics of the formation and whether or not fracturing of the formation is desired. After the aqueous acidic solution has been injected, the well may be shut in and allowed to stand for a period of several hours or more depending on the type of acid employed and the formation treated. If there is pressure on the well, pressure then can be released and the spent or at least partially spent aqueous acidic solution, containing salts formed by the reaction of the acid, is permitted to flow back into the well bore and is pumped or flowed to the surface for appropriate disposal. The well then can be placed on production or used for other purposes.

To further illustrate the effectiveness of the corrosion inhibitor employed in the aqueous acidic solution of the present invention, but not by way of limitation, the following examples are provided.

EXAMPLE I

To determine the effectiveness of various antimony compounds as a constituent of the corrosion inhibitor of the present invention, the following tests were performed. An acidic aqueous solution is prepared by adding a sufficient quantity of concentrated hydrochloric acid to water to form a fifteen percent HCl solution. A corrosion inhibitor composition is prepared in accordance with the present invention by admixing the following constituents: a quaternary ammonium compound, a heavy aromatic hydrocarbon compound, acetylenic alcohol, a a surfactant comprising an ethyoxylated phenol and a solvent comprising an alkanol. Then a quantity of an antimony compound, as set forth in the following table, is admixed in the treating acid and co-mixed with the other constituents of the corrosion inhibitor. A sufficient quantity of each corrosion inhibitor is added to a sample of the aqueous acid to comprise two percent by volume of the solution. The solution is heated to a temperature of 325° F. under a 500 psig. over pressure of an inert heat transfer fluid and a weighed sample of Type N-80 tubing steel is suspended in each solution. The volume to surface area ratio of the acidic solution to the ferrous metal sample is about 25 cc/in$^2$. After two hours, the sample is removed from the heated acidic solution, washed and weighed to determine the corrosion loss. The corrosion loss is determined by the following formula:

Corrosion loss = $(W_1 - W_2)/A$ $W_1$ = initial weight of ferrous metal sample, lb.
$W_2$ = final weight of ferrous metal sample, lb.
A = a factor for converting grams of metal loss per square inch to pounds of metals per square foot and is equal to 14.08.

The results of the tests are set forth in Table I, below.

TABLE I

| Antimony Compound | Concentration of Antimony Compound per 100 ml of 15% HCl | Corrosion Loss, Lb./Ft.$^2$ |
| --- | --- | --- |
| None | | 0.130 |
| $Sb_2O_3$ | 0.10 gm | 0.007 |
| $Sb_2O_5$ | 0.17 gm | 0.012 |
| $K_4Sb_2O_7$ | 0.54 gm | 0.006 |
| $K_2H_2Sb_2O_7$ | 0.45 gm | 0.007 |
| $Sb_2S_3$ | 0.18 gm | 0.070 |
| $SbCl_3$ | 0.45 ml | 0.004 |
| $SbCl_5$ | 0.45 ml | 0.007 |
| $K_2Sb_2(C_4O_6H_4)_2$ | 0.70 gm | 0.005 |
| $Sb[(CH_2OH)_2]_3$ | 0.20 gm | 0.005 |
| $Sb(C_6H_5)_3$ | 0.30 gm | 0.542 |

The results of most of the antimony compounds are well within the general oil industry standard maximum allowable corrosion rate of about 0.05 pounds per square foot of ferrous metal equipment surface area exposed to an acidic aqueous solution during acidizing of a subterranean formation.

EXAMPLE II

To illustrate the variety of acetylenic alcohols which may be employed in the corrosion inhibitor of the present invention, the following tests were performed. An acidic aqueous solution is prepared as in Example I. A corrosion inhibitor composition is prepared in accordance with the present invention by admixing the following constituents: a quaternary ammonium compound, a heavy aromatic hydrocarbon compound, a surfactant comprising an ethoxylated phenol, a solvent comprising an alkanol and an acetylenic alcohol. An antimony compound is admixed with the acidic aqueous solution in an amount sufficient to provide an antimony concentration of about 0.004 molar in the acidic aqueous solution. A sufficient quantity of the remaining constituents of the corrosion inhibitor is added to a sample of the aqueous acidic solution to comprise 1.2 percent by volume of the solution. The solution is heated to 325° F. under a 500 psig. overpressure of an inert heat transfer fluid and a weighed sample of Type N-80 tubing steel is suspended in each solution. The volume to surface area ratio of the acidic solution to the ferrous metal sample is about 25 cc/in$^2$. After two hours, the sample is removed from the heated acidic solution, washed and weighed to determine the corrosion loss. The results of the tests are set forth in Table II, below.

TABLE II

| Acetylenic Alcohol Employed in Corrosion Inhibitor | Corrosion Loss, Lb/Ft$^2$ |
| --- | --- |
| Propargyl | 0.018 |
| Methylbutynol | 0.012 |
| Hexynol | 0.012 |
| Ethyl octynol | 0.007 |
| ANCOR 20[1] | 0.041 |
| ANCOR 30 | 0.015 |
| SURFYNOL 104-H[2] | 0.019 |

[1]Commercial product sold by Air Products and Chemicals, Inc., Allentown, PA, comprising a proprietary blend of acetylenic alcohols
[2]Commercial product sold by Air Products and Chemicals, comprising 2,4,7,9-tetramethyl-5-decyn-4,7 diol, 80% active in ethylene glycol The data clearly illustrates the utility of acetylenic alcohols of the general formula herein before set forth.

EXAMPLE III

To illustrate the range of aromatic hydrocarbon compounds having high oil wetting characteristics that can be used in the corrosion inhibitor of the present invention, the following tests were performed. An acidic aqueous solution is prepared and the experimental procedure is performed as in Example II. A corrosion inhibitor composition is prepared in accordance with the present invention by admixing the following constituents: a quaternary ammonium compound, an acetylenic alcohol, various hydrohydrocarbon comoounds as set forth below, a surfactant comprising an ethoxylated phenol and a solvent comprising an alkanol.

An antimony compound is admixed in an amount sufficient to provide an antimony concentration of about 0.004 molar in the acidic aqueous solution. The results are set forth in Table III, below.

TABLE III

| Aromatic Hydrocarbon Compound | Corrosion Loss, Lb./Ft.$^2$ |
| --- | --- |
| Xylenes | 0.022 |
| Xylenes-saturated with biphenyl mixture | 0.013 |

TABLE III-continued

| Aromatic Hydrocarbon Compound | Corrosion Loss, Lb./Ft.$^2$ |
|---|---|
| Heavy aromatic naphtha | 0.006 |

EXAMPLE IV

To illustrate the effect the ratio of the acetylenic alcohol to the aromatic hydrocarbon compound in the corrosion inhibitor has upon the effectiveness of the inhibitor and the effect the percentage of the acetylenic alcohol in the composition has upon the corrosion inhibitor, the following tests were performed. An aqueous acid is prepared and the experimental procedure is followed as in Examples I and II. A corrosion inhibitor is prepared comprising a quaternary ammonium compound, an alkanol, a surfactant comprising an ethoxylated phenol, acetylenic alcohol and heavy aromatic hydrocarbon compound. The quantity of acetylenic alcohol and heavy aromatic hydrocarbon compound is varied to provide the ratios set forth below. The results of the tests are set forth in Table IV, below.

TABLE IV

| Ratio of Acetylenic Alcohol to Aromatic Hydrocarbon | Ratio of Acetylenic Alcohol to Inhibitor Composition | Corrosion Loss, Lb./Ft.$^2$ |
|---|---|---|
| 1.66 | 0.32 | 0.011 |
| 0.41 | 0.13 | 0.010 |
| 0.19 | 0.08 | 0.013 |
| 0.08 | 0.03 | 0.807 |

The data clearly illustrates the effect the presence of the acetylenic alcohol and the ratio of acetylenic alcohol to aromatic hydrocarbon has upon the effectiveness of the corrosion inhibitor composition.

While particular embodiments of the invention have been described, it is to be understood that such descriptions are presented for purposes of illustration only and that the invention is not limited thereto and that reasonable variations and modifications, which will be apparent to those skilled in the art, can be made without departing from the spirit of scope of the invention as set forth in the appended claims.

What is claimed is:

1. A method of acidizing a subterranean formation penetrated by a ferrous metal well bore whereby corrosive effects of an acidic solution on ferrous metals in contact with said acidic solution is minimized which comprises:
    contacting said formation with an aqueous acidic solution comprising hydrochloric acid, which contains a corrosion inhibitor composition consisting essentially of a corrosion-reducing effective amount of at least one acetylenic alcohol having the general formula:

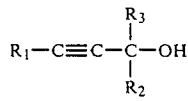

wherein $R_1$, $R_2$ and $R_3$ are selected from the group consisting of hydrogen, alkyl, phenyl, substituted phenyl and hydroxy-alkyl radicals present in an amount sufficient to comprise at least about 5 percent by volume of said inhibitor composition, a quaternary ammonium compound selected from the group consisting of the N-methyl, N-benzyl and chloromethyl naphthalene quaternaries of alkyl pyridines and quinoline, isoquinoline compounds, benzoquinoline compounds and mixtures thereof, an aromatic hydrocarbon compound which exhibits high oil-wetting characteristics present in an amount sufficient to provide a ratio by volume of acetylenic alcohol to aromatic hydrocarbon of at least about 0.05:1 and an antimony compound which is activated by the other constituents of said corrosion inhibitor composition to reduce the corrosive effect of said acidic solution on said ferrous metal, said antimony compound being at least one member selected from the group consisting of antimony trioxide, pentoxide, trichloride, sulfide, pentachloride, tartrate, and trifluoride, alkali metal salts of antimony tartrate, alkali metal salts of pyroantimonate, antimony adducts of ethylene glycol and solutions containing ethylene glycol, and the oxidized product of hydrogen peroxide and at least one member selected from the group consisting of trivalent antimony compounds and being present in an amount sufficient to provide an antimony concentration of from about 0.0007 to about 0.04 molar to said corrosive acid.

2. The method of claim 1 wherein said corrosion inhibitor composition contains a solvent effective amount of an alkanol.

3. The method of claim 1 wherein said corrosion inhibitor composition contains a non-ionic surfactant.

4. The method of claim 1 wherein the volumetric ratio of said acetylenic alcohol to said aromatic hydrocarbon is in the range of from about 0.08:1 to about 1.66:1.

5. The method of claim 1 wherein said corrosion inhibitor composition is present in said acidic solution in an amount of at least about 0.5 percent by volume of said acidic solution.

6. A method of inhibiting the corrosivity an aqueous corrosive acid comprising hydrochloric acid in contact with a ferrous metal at elevated temperatures which comprise adding to said corrosive acid comprising hydrochloric acid an inhibiting effective amount of a corrosion inhibitor composition consisting essentially of:
    at least one acetylenic alcohol having the general formula

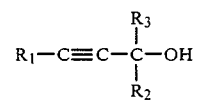

wherein $R_1$, $R_2$ and $R_3$ are selected from the group consisting of hydrogen, alkyl, phenyl, substituted phenyl and hydroxy-alkyl radicals present in an amount sufficient to comprise at least about 5 percent by volume of said inhibitor composition;
    (a quaternary ammonium compound selected from the group consisting of the N-methyl, N-benzyl and chloromethyl naphthalene quaternaries of alkyl pyridines and quinoline, isoquinoline compounds, benzoquinoline compounds and mixtures thereof;
    an aromatic hydrocarbon compound which exhibits high oil-wetting characteristics present in an amount sufficient to provide a ratio by volume of acetylenic alcohol to aromatic hydrocarbon of at least about 0.05:1; and
    an antimony compound capable of activation by the other constituents of said corrosion inhibitor composition whereby the corrosivity of said corrosive acid in contact with said ferrous metal is reduced, said antimony compound being at least one member selected from the group consisting of antimony trioxide, pentoxide, trichloride, sulfide, pentachloride, tartrate, and trifluoride, alkali metal salts of antimony tartrate, alkali metal salts of pyroantimonate, antimony adducts of ethylene glycol and solutions containing ethylene glycol, and the oxidized product of hydrogen peroxide and at least one member selected from the group consisting of trivalent antimony compounds and being present in an amount sufficient to provide an antimony concentration of from about 0.0007 to about 0.04 molar to said corrosive acid.

7. The method of claim 6 wherein said corrosion inhibitor composition contains a solvent effective amount of an alkanol.

8. The method of claim 6 wherein said corrosion inhibitor composition contains a non-ionic surfactant.

9. The method of claim 6 wherein the volumetric ratio of said acetylenic alcohol to said hydrocarbon having high oil-wetting characteristics is in the range of from about 0.08:1 to about 1.66:1.

10. The method of claim 6 wherein said corrosion inhibitor composition is present in said acidic solution in an amount of at least about 0.5 percent by volume of said acidic solution.

11. An acidic composition comprising:
an aqueous ferrous metal corrosive acid comprising hydrochloric acid; and
a corrosion inhibitor composition consisting essentially of at least one acetylenic alcohol having the general formula

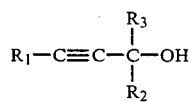

wherein $R_1$, $R_2$ and $R_3$ are selected from the group consisting of hydrogen, alkyl, phenyl, substituted phenyl and hydroxy-alkyl radicals present in an amount sufficient to comprise at least about 5 percent by volume of said inhibitor composition;
a quaternary ammonium compound selected from the group consisting of the N-methyl, N-benzyl and chloromethyl naphthalene quaternaries of alkyl pyridines and quinoline, isoquinoline compounds, benzoquinoline compounds and mixtures thereof;
an aromatic hydrocarbon compound which exhibits high oil-wetting characteristics present in an amount sufficient to provide a ratio by volume of acetylenic alcohol to aromatic hydrocarbon of at least about 0.05:1; and
an antimony compound capable of activation by the other constituents of said corrosion inhibitor composition whereby the corrosivity of said corrosive acid in contact with said ferrous metal is reduced, said antimony compound being at least one member selected from the group consisting of antimony trioxide, pentoxide, trichloride, sulfide, pentachloride, tartrate, and trifluoride, alkali metal salts of antimony tartrate, alkali metal salts of pyroantimonate, antimony adducts of ethylene glycol and solutions containing ethylene glycol, and the oxidized product of hydrogen peroxide and at least one member selected from the group consisting of trivalent antimony compounds and being present in an amount sufficient to provide an antimony concentration of from about 0.0007 to about 0.04 molar to said corrosive acid.

12. The method of claim 11 wherein said corrosion inhibitor composition contains a solvent effective amount of an alkanol.

13. The method of claim 11 wherein said corrosion inhibitor composition contains a surfactant.

14. The method of claim 11 wherein the volumetric ratio of said acetylenic alcohol to said hydrocarbon in said corrosion inhibitor is in the range of from about 0.08:1.0 to about 1.66:1.

15. The method of claim 11 wherein said acetylenic alcohol comprises from about 5 percent to about 35 percent by volume of said corrosion inhibitor composition.

* * * * *